(12) United States Patent
Han et al.

(10) Patent No.: US 9,867,207 B2
(45) Date of Patent: Jan. 9, 2018

(54) SIMULTANEOUS SCHEDULING REQUEST TRANSMISSION IN DUAL CONNECTIVITY

(71) Applicant: Intel IP Corporation, Santa Clara, CA (US)

(72) Inventors: Seunghee Han, Cupertino, CA (US); Yujian Zhang, Beijing (CN); Hong He, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 26 days.

(21) Appl. No.: 14/696,587

(22) Filed: Apr. 27, 2015

(65) Prior Publication Data

US 2015/0312930 A1  Oct. 29, 2015

Related U.S. Application Data

(60) Provisional application No. 61/985,352, filed on Apr. 28, 2014.

(51) Int. Cl.
*H04W 72/12* (2009.01)
*H04W 76/02* (2009.01)

(52) U.S. Cl.
CPC ..... *H04W 72/1247* (2013.01); *H04W 76/025* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 7,908,396 B2 | 3/2011 | Kkalyanasundaram et al. | |
| 2006/0018329 A1* | 1/2006 | Nielsen | H04L 47/52 370/401 |

(Continued)

FOREIGN PATENT DOCUMENTS

| | | |
|---|---|---|
| EP | 3138347 A | 3/2017 |
| JP | 2010-510712 A | 4/2010 |

(Continued)

OTHER PUBLICATIONS

International Preliminary Report on Patentability received for International Application No. PCT/US2015/027710, dated Nov. 10, 2016, 11 pages.

(Continued)

*Primary Examiner* — Chi H Pham
*Assistant Examiner* — Shick Hom
(74) *Attorney, Agent, or Firm* — Alpine Technology Law Group LLC

(57) ABSTRACT

Briefly, in accordance with one or more embodiments, an apparatus may be configured to receive a first scheduling request transmission for a first cell group, and a second scheduling request transmission for a second cell group, determine one of the first scheduling request and the second scheduling request to have a higher priority and another one of the first scheduling request and the second scheduling request to have a lower priority, and process the scheduling request having a higher priority without processing the scheduling request having a lower priority. An apparatus may be configured to combine a configuration of a first scheduling request for a first cell group and a second configuration of a second scheduling request for a secondary cell group in a system radio bearer, and transmit the SRB to a user equipment to process the first scheduling request and the second scheduling request.

27 Claims, 6 Drawing Sheets

(56) References Cited

U.S. PATENT DOCUMENTS

| | | | |
|---|---|---|---|
| 2007/0124735 A1* | 5/2007 | Kalyanasundaram | G06F 9/5011 |
| | | | 718/107 |
| 2012/0147778 A1* | 6/2012 | Ishii | H04W 72/1268 |
| | | | 370/252 |
| 2012/0269154 A1* | 10/2012 | Wang | H04W 72/1242 |
| | | | 370/329 |
| 2013/0242730 A1* | 9/2013 | Pelletier | H04W 28/0284 |
| | | | 370/230 |
| 2013/0308574 A1* | 11/2013 | Jeong | H04L 12/5695 |
| | | | 370/329 |
| 2014/0036885 A1* | 2/2014 | Moberg | H04W 72/1284 |
| | | | 370/336 |
| 2014/0119304 A1* | 5/2014 | Li | H04W 52/146 |
| | | | 370/329 |
| 2015/0223235 A1 | 8/2015 | Hwang et al. | |
| 2015/0365831 A1* | 12/2015 | Ko | H04L 5/0053 |
| | | | 370/329 |

FOREIGN PATENT DOCUMENTS

| | | |
|---|---|---|
| JP | 2017-513306 A | 5/2017 |
| WO | 2008060201 A1 | 5/2008 |
| WO | 2013164105 A1 | 11/2013 |
| WO | 2014051254 A1 | 4/2014 |

OTHER PUBLICATIONS

Korean Patent Appln. No. 2016-7026648 Notice of Preliminary Rejection, 6 pages, dated May 30, 2017.

International Search Report and Written Opinion, International Application No. PCT/US2015/027710, dated Jul. 29, 2015, 14 pages.

Fujitsu, "Physical layer issues of dual connectivity", 3GPP TSG RAN WG1 Meeting #76, Prague, Czech Republic, Feb. 10-1, 2014, 8 pages.

Huawei, Hisilicon, "Uplink Power allocation in Dual connectivity", 3GPP TSG RAN WG1 Meeting #76bis, Shenzhen, China, Mar. 31-Apr. 4, 2014, 4 pages.

China Telecom, "UL Power transmission for dual connectivity", 3GPP TSG RAN WG1 Meeting #76bis, Shenzhen, China, Mar. 31-Apr. 4, 2014, 3 pages.

NSN, Nokia, "Control signalling for dual connectivity", 3GPP TSG-RAN WG1 Meeting #76bis, Shenzhen, China, Mar. 31-Apr. 4, 2014, 2 pages.

Notice of Reasons for Refusal, Japanese Application No. 2016-555818, dated Oct. 23, 2017, 11 pages.

Notice of Publication for Hong Kong Application No. 17102888.2, dated Nov. 17, 2017, 5 pages.

* cited by examiner

SIMULTANEOUS SCHEDULING REQUEST TRANSMISSION IN DUAL CONNECTIVITY

CROSS-REFERENCE TO RELATED APPLICATIONS

The present application claims the benefit of U.S. Provisional Application No. 61/985,352 filed Apr. 28, 2014. Said Application No. 61/985,349 is hereby incorporated herein by reference in its entirety.

BACKGROUND

Dual Connectivity (DC) is an operation where a given user equipment (UE) consumes radio resources provided by at least two different network points connected with a non-ideal backhaul. Furthermore, each evolved Node B (eNB) involved in DC for a UE may assume different roles. Such roles do not necessarily depend on the power class of the eNB and may vary among different UEs. In the context of carrier aggregation (CA), a scheduling request (SR) is transmitted using physical uplink control channel (PUCCH) Format 1 in a primary cell (PCell) only, but is not allowed to be transmitted in a secondary cell (SCell). In DC, an SR also can be transmitted using PUCCH Format 1 in a special secondary cell (pSCell). When two SR transmissions of the PCell and a pSCell happen simultaneously, the full power of the UE may not be utilized, resulting in a negative impact for the UE especially when the UE is in a power limited scenario.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
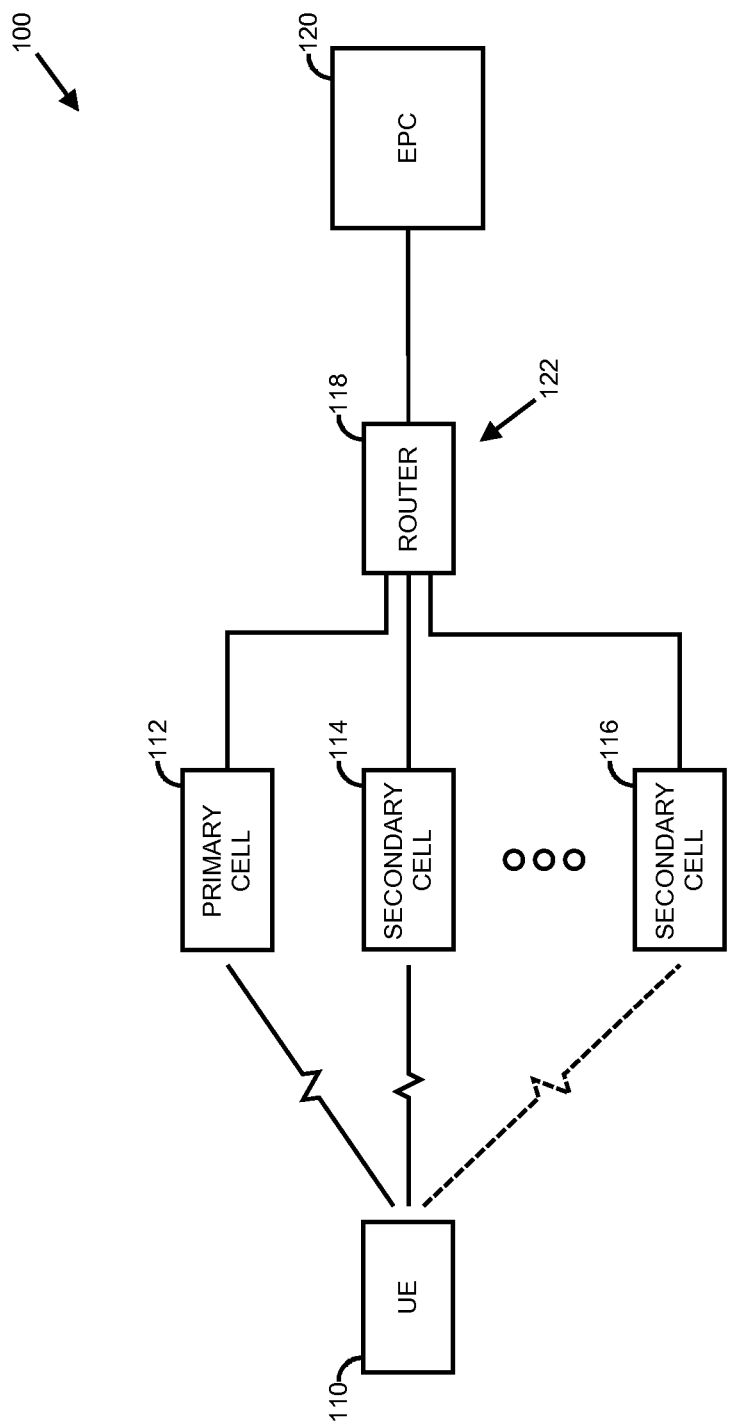
FIG. 1 is a diagram of a dual connectivity network having a higher level aggregation point in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "On," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 2:
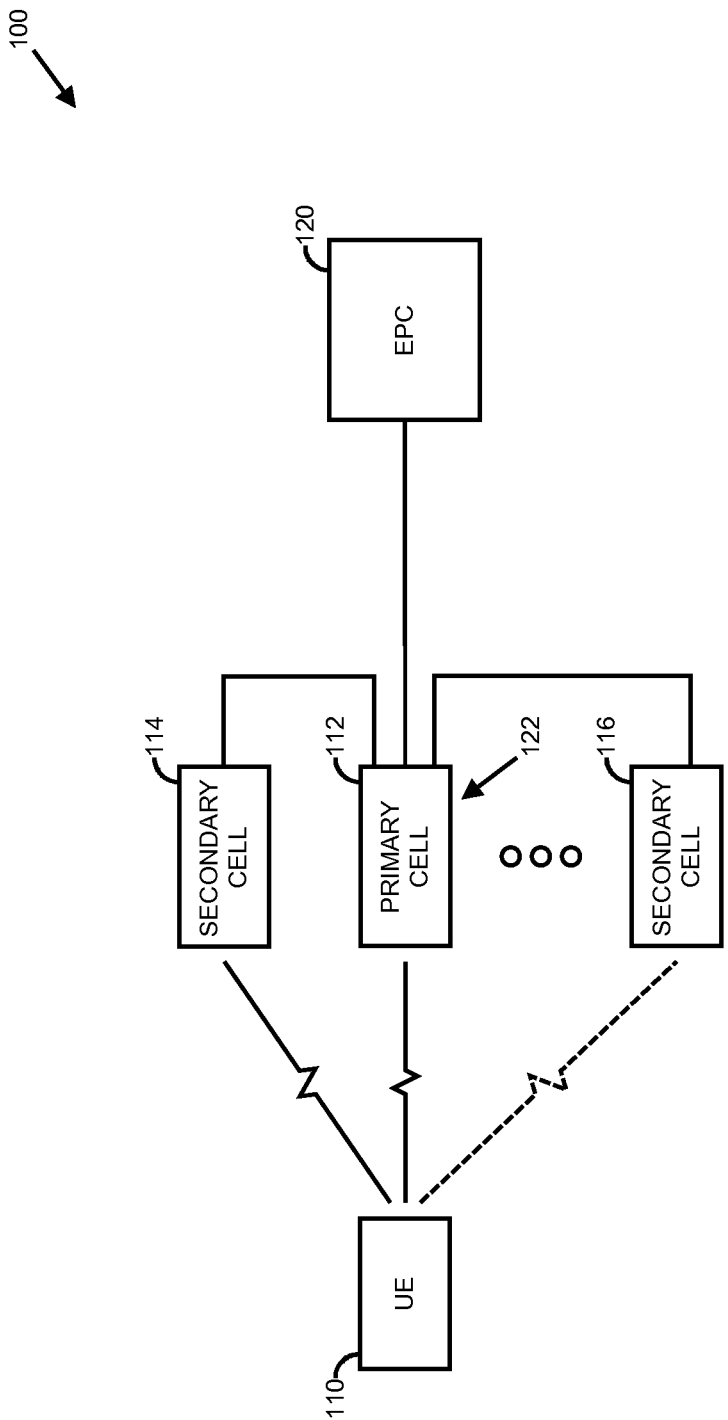
FIG. 2 is a diagram of a dual connectivity network wherein a master enhanced Node B functions as an aggregation point in accordance with one or more embodiments.

Referring now to FIG. 1 and FIG. 2, diagrams of a dual connectivity network having a higher level aggregation point and where a master enhanced Node B functions as an aggregation point, respectively, in accordance with one or more embodiments will be discussed. As shown in FIG. 1 and FIG. 2, network 100 may implement dual connectivity wherein user equipment (UE) 110 simultaneously connects with a primary cell 112 and one or more secondary cells such as secondary cell 114 and/or secondary cell 116. Network 100 may be in compliance with a Third Generation Partnership Project (3GPP) standard such as a Long Term Evolution (LTE) standard, for example LTE Release 12, and the scope of the claimed subject matter is not limited in this respect. In one or more embodiments, one or more of primary cell 112, secondary cell 114, or secondary cell 116 may comprise an evolved Node B (eNB) and/or other small cells to provide a co-channel arrangement, an inter-frequency arrangement, and/or an out of coverage of a macro cell arrangement, and the scope of the claimed subject matter is not limited in these respects. In one or more embodiments, primary cell 112 may be referred to as a master cell or master eNB, and the scope of the claimed subject matter is not limited in this respect. One or more cells of network 100 may comprise a cell group wherein a Master Cell Group may refer to a group of serving cells or nodes associated with primary cell 112 or Master eNB, and a Secondary Cell Group may refer to a group of servicing cells associated with a secondary eNB such as secondary cell 114 or secondary cell 116. The Master eNB may refer to the eNB which terminates with an S1 Mobility Management Entity (S1-MME), and a Secondary eNB may be an eNB or cell that provides additional radio resources for UE 110, and which is not the Master eNB. Furthermore, in a dual connectivity arrangement such as shown in FIG. 1, a bearer may be split among two or more eNBs.

As shown in FIG. 1, primary cell 112, secondary cell 114, and secondary cell 116 may be connected with a non-ideal backhaul via a higher level aggregation point 122, for example via router 118. Aggregation point 122 connects the dual connectivity network nodes to the Evolved Packet Core (EPC) 120 of network 100. As shown in FIG. 2, primary cell 112 may be configured to operate as an aggregation point 122 for all cells for connectivity to EPC 120. In one or more embodiments, when a dual connectivity arrangement is provided, the radio nodes of network 100 comprising the different cell groups are not allowed to transmit scheduling requests simultaneously or at any overlapped portions, for example at the subframe level or otherwise, for both power limited and non-power limited situations. A simultaneous scheduling request may be defined as when two scheduling requests transmissions occur in a same subframe wherein the scheduling requests may be fully overlapped, or when a prior scheduling transmission has occurred from a first cell group and a subsequent scheduling transmission occurs from a second cell group wherein the scheduling requests may be partially overlapped in a subframe. As will be discussed in further detail, below, various embodiments may prevent such overlapping scheduling requests, for example to allow UE 110 to fully utilize its transmit power.

Figure 3:
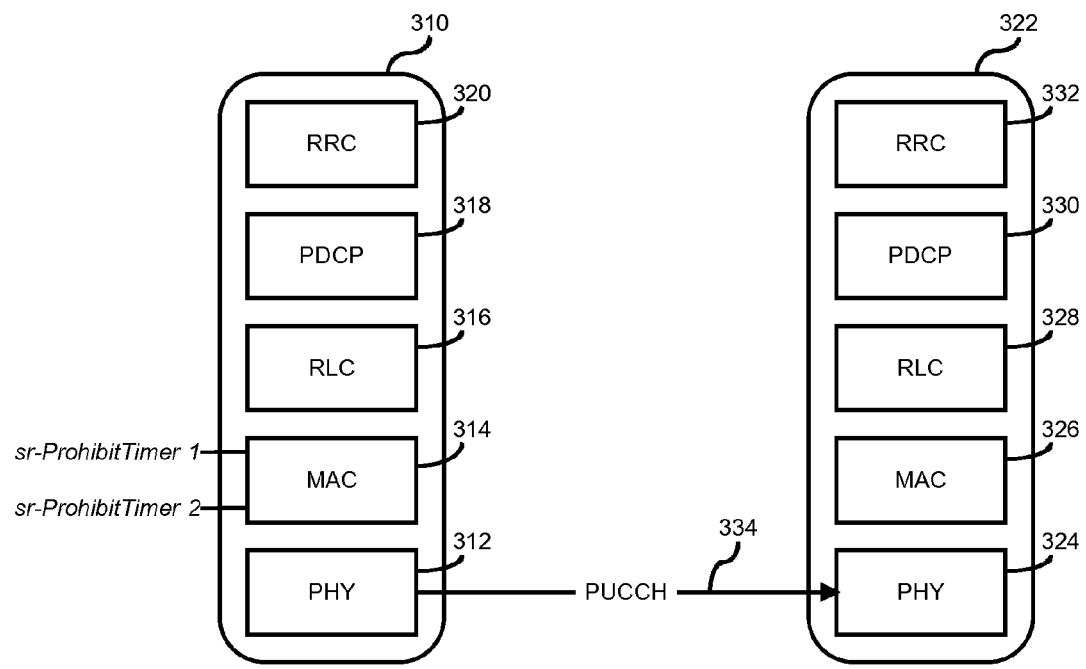
FIG. 3 is a diagram of network protocol layers for a user equipment and for a radio access network node of the networks of FIG. 1 or FIG. 2 in accordance with one or more embodiments.

Referring now to FIG. 3, a diagram of network protocol layers for a user equipment and for a radio access network node of the networks of FIG. 1 or FIG. 2 in accordance with one or more embodiments will be discussed. In one or more embodiments, UE 110 as shown in FIG. 1 and FIG. 2 may implement network protocol layers 310 including physical (PHY) layer 312, media access control (MAC) layer 314, radio link control (RLC) layer 316, packet data convergence protocol (PDCP) layer 318, and/or radio resource control (RRC) layer 320, although the scope of the claimed subject matter is not limited in this respect. Similarly, one or more of the nodes of network 100 such as primary cell 112, secondary cell 114, and/or secondary cell 116 may implement a network protocol layer 322 including physical (PHY) layer 324, media access control (MAC) layer 326, radio link control (RLC) layer 328, packet data convergence protocol (PDCP) layer 330, and/or radio resource control (RRC) layer 332, although the scope of the claimed subject matter is not limited in this respect. A physical uplink control channel 334 may be provided between PHY layer 312 and PHY layer 324 to carry uplink control information between UE 110 and one or more nodes of network 100.

In one or more embodiments, there may be two cases for handling scheduling requests. A first case may involve separate scheduling request handling in the MAC layer such as MAC layer 314, for example using two different scheduling request prohibit timers (sr-ProhibitTimer) such as sr-ProhibitTimer 1 and sr-ProhibitTimer 2. A second case may involve common scheduling request handling in the MAC layer such as MAC layer 314, for example using single sr-ProhibitTimer such as sr-ProhibitTimer 1. Regardless of which case is utilized, when scheduling request transmissions from two or more different cell groups having in the same frame, either by being fully overlapping or overlapping at least in part, in general only one of the scheduling requests is allowed to occur as discussed in further detail, below.

Figure 4:
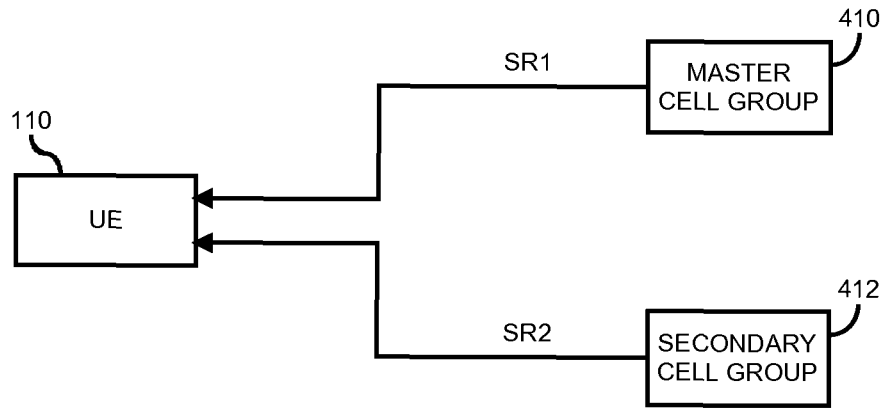
FIG. 4 is a diagram of a user equipment to receive scheduling requests from different cell groups in accordance with one or more embodiments.

Referring now to FIG. 4, a diagram of a user equipment to receive scheduling requests from different cell groups in accordance with one or more embodiments will be discussed. In some embodiments, simultaneous scheduling request transmissions from different cell groups may be handled in the physical (PHY) layer 312. In one such embodiment, a first scheduling request (SR1) may be transmitted from a first cell group such as master cell group 410, and a second scheduling request (SR2) may be transmitted from a second cell group such as secondary cell group 412. In such a situation, the earlier or prior scheduling request transmission has priority, and the later scheduling request transmission is made pending to be transmitted in a next available scheduling request resource. Alternatively, the scheduling request transmission (SR1) from master cell group 410 may have a higher priority over a scheduling request transmission from a cell group other than master cell group 410, for example scheduling request transmission (SR2) from secondary cell group 412. In such as case, the scheduling request transmission that is not from master cell group 410 is dropped, and UE 110 indicates to MAC layer 314 that the scheduling request transmission that is not from master cell group 412 has been dropped. MAC layer 314 then may instruct PHY layer 312 to signal a scheduling request on the physical uplink control channel (PUCCH) 334 to indicate that a scheduling request is pending. If a prior scheduling request transmission is from secondary cell group 412 and a later scheduling request transmission is from master cell group 410, the scheduling request transmission (SR2) from secondary cell group 412 may be dropped, and the scheduling request transmission (SR1) from master cell group 410 may continue.

In one or more alternative embodiments, simultaneous scheduling request transmissions from different cell groups may be handled in the media access control (MAC) layer 314. In some embodiments, user equipment (UE) 110 has a single scheduling request prohibit timer (sr-ProhibitTimer) for both master cell group 410 which includes the master evolved node B (MeNB) and secondary cell group 412 which includes a secondary evolved node B (SeNB). By having a common sr-ProhibitTimer for both master cell group 410 and secondary cell group 412, the scheduling request for the cell group that was triggered later than a previous scheduling request schedule for another cell group automatically may be pending to a next available scheduling request opportunity. For example, assuming the following existing instructions happens per cell, an instruction to the physical (PHY) layer 312 to signal the signaling request on the physical uplink control channel (PUCCH) 334 cannot be performed for the later triggered scheduling request for another cell group. Instead, the instruction to the PHY layer 312 to signal the signaling request on the physical uplink control channel PUCCH 334 for the later triggered scheduling request for the other cell group will be performed in the next scheduling request opportunity.

If no uplink shared channel (UL-SCH) resources are available for a transmission in this transmission time interval (TTI):
    if the user equipment (UE) has no valid physical uplink control channel (PUCCH) resource for scheduling request (SR) configured in any TTI: initiate a Random Access procedure on the primary cell (PCell) and cancel all pending SRs;

else if the UE has a valid PUCCH resource for SR configured for this TTI and if this TTI is not part of a measurement gap and if sr-ProhibitTimer is not Running:
   if scheduling request counter (SR_COUNTER)<dsr-TransMax:
   increment SR_COUNTER by 1;
   instruct the physical layer to signal the SR on PUCCH;
   start the sr-ProhibitTimer.
else:
   notify RRC to release PUCCH/SRS for all serving cells;
   clear any configured downlink assignments and uplink grants;
   initiate a Random Access procedure on the PCell and cancel all pending SRs.

In alternative embodiments, UE 110 may have an independent sr-ProhibitTimer for master cell group 410 which includes the MeNB and secondary cell group 412 which includes an SeNB. If UE 110 has a different sr-ProhibitTimer for master cell group 410 and secondary cell group 412, UE 110 may perform a further step to check if there is an ongoing prior scheduling request transmission. In the event there is any ongoing prior scheduling request transmission, then a later trigger scheduling request may be made pending to a next available scheduling request opportunity, for example as shown in the sample instructions, below.

If no uplink shared channel (UL-SCH) resources are available for a transmission in this transmission time interval (TTI):
   if the user equipment (UE) has no valid physical uplink control channel (PUCCH) resource for scheduling request configured in any TTI: initiate a Random Access procedure on the primary cell (PCell) and cancel all pending SRs;
   else if the UE has a valid PUCCH resource for SR configured for this TTI and if this TTI is not part of a measurement gap and if sr-ProhibitTimer is not running and if there is no on-going SR transmission for any other cell group:
      if SR_COUNTER<dsr-TransMax:
      increment SR_COUNTER by 1;
      instruct the physical layer to signal the SR on PUCCH;
      start the sr-ProhibitTimer.
   else:
      notify radio resource control (RRC) to release PUCCH/SRS for all serving cells;
      clear any configured downlink assignments and uplink grants;
      initiate a Random Access procedure on the PCell and cancel all pending SRs.

Figure 5:
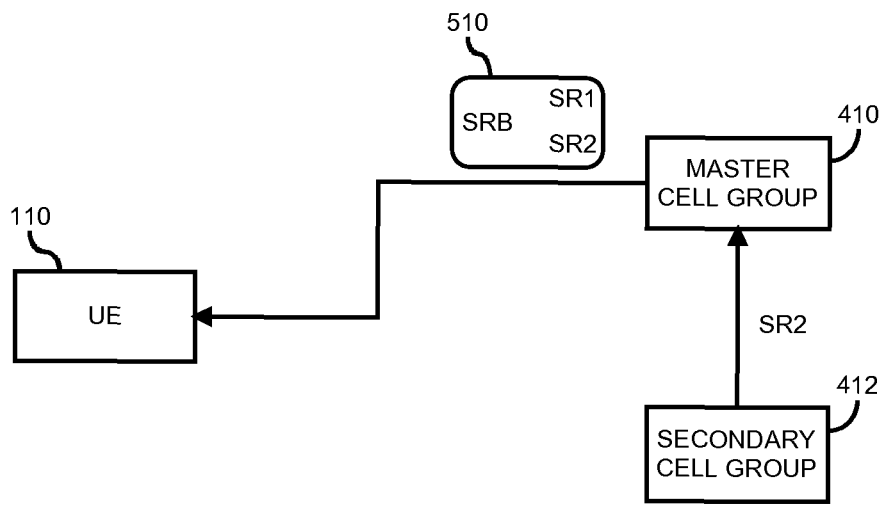
FIG. 5 is a diagram of a user equipment to receive scheduling requests from different cell groups via a system radio bearer in accordance with one or more embodiments.

Referring now to FIG. 5, a diagram of a user equipment to receive scheduling requests from different cell groups via a system radio bearer in accordance with one or more embodiments will be discussed. In some embodiments, the handling of simultaneous scheduling resource transmissions from the different cell groups may be handled by network configuration of network 100. In such embodiments, a System Radio Bearer (SRB) 510 may be transmitted via master cell group 410, and may have the independent scheduling resource configuration for both master cell group 410 including the master evolved node B (eNB) and secondary cell group 412 including a secondary evolved Node B (SeNB). As a result, the scheduling request configurations received for both master cell group 410 and secondary cell group 412 may be signaled via the master evolved Node B (MeNB) of master cell group 410. Therefore, network 100 is capable of ensuring that the scheduling request configurations received from different cell groups will not overlap each other for a given UE 110. In such an implementation, UE 110 may assume there are no overlapped scheduling request resources resource between master cell group 410 and secondary cell group 412. For example, master cell group 410 may receive a scheduling request SR2 from secondary cell group and ensure that scheduling request SR2 does not overlap its own scheduling request SR1 when configured in SRB 510. In one particular embodiment, it may be up to UE 110 to select one of the available transmissions if multiple scheduling request transmissions happen to occur simultaneously.

In alternative embodiments, network 100 ensures that scheduling request configurations are not configured to be overlapping among multiple cell groups. Since System Radio Bearer (SRB) 510 is transmitted via master cell group 410, network 100 is capable to provide scheduling request configurations for each cell group such that the scheduling request configurations do not overlap each other. For example, master cell group 410 is capable of providing all scheduling requests for both itself and for secondary cell group 412, and ensuring that the two scheduling request configurations to not overlap each other. In an arrangement, UE 110 may assume there will be no case of overlapping scheduling request transmissions.

Figure 6:
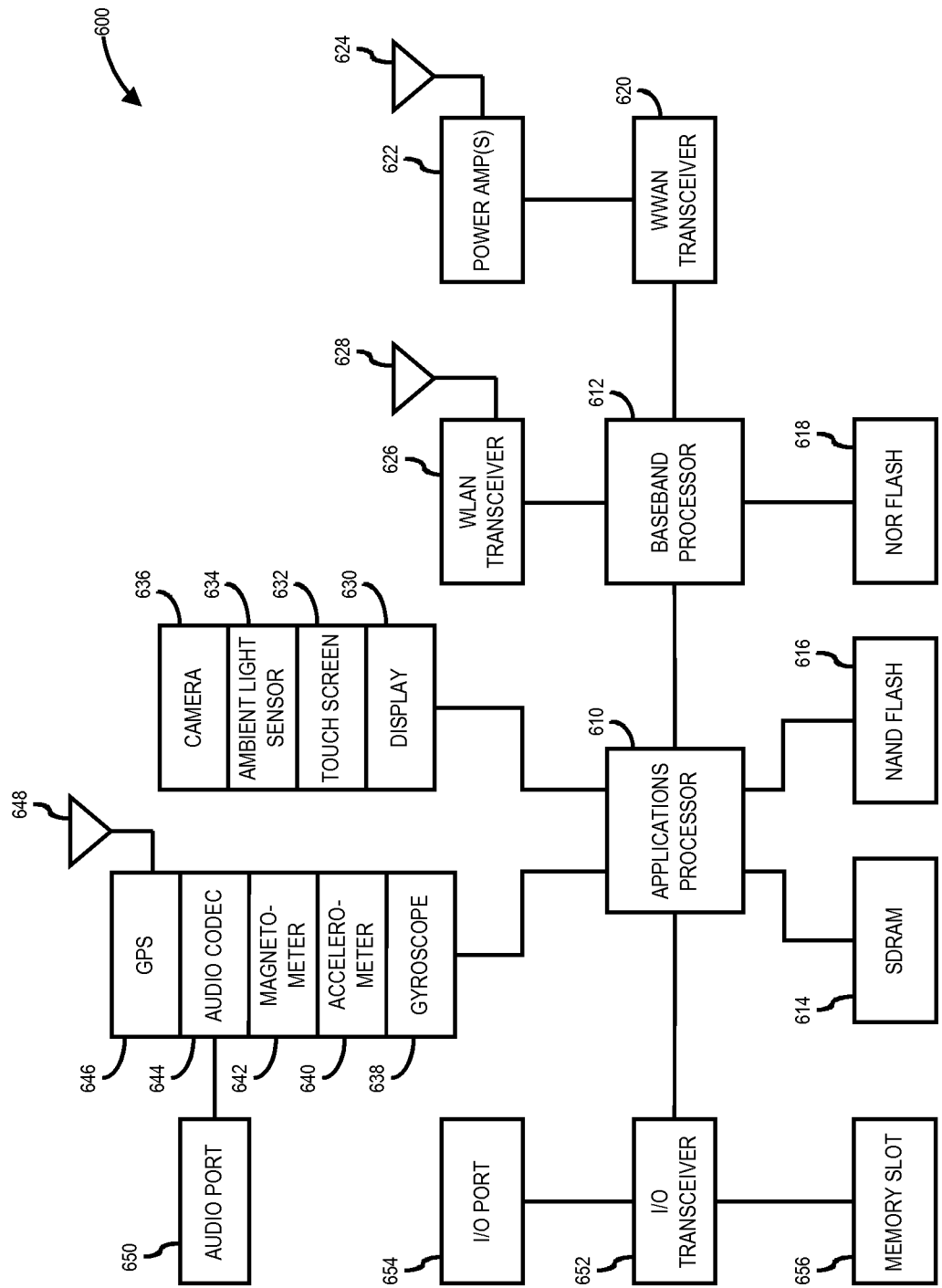
FIG. 6 is a block diagram of an information handling system capable of handling simultaneous scheduling request transmission in dual connectivity in accordance with one or more embodiments.

Referring now to FIG. 6, a block diagram of an information handling system capable of handling simultaneous scheduling request transmission in dual connectivity in accordance with one or more embodiments will be discussed. Information handling system 600 of FIG. 6 may tangibly embody any one or more of the elements described herein, above, including for example UE 110, primary cell 112, secondary cell 114, secondary cell 116, router 118, and/or EPC 120, with greater or fewer components depending on the hardware specifications of the particular device. Although information handling system 600 represents one example of several types of computing platforms, information handling system 600 may include more or fewer elements and/or different arrangements of elements than shown in FIG. 6, and the scope of the claimed subject matter is not limited in these respects.

In one or more embodiments, information handling system 600 may include an application processor 610 and a baseband processor 612. Application processor 610 may be utilized as a general-purpose processor to run applications and the various subsystems for information handling system 600. Application processor 610 may include a single core or alternatively may include multiple processing cores wherein one or more of the cores may comprise a digital signal processor or digital signal processing (DSP) core. Furthermore, application processor 610 may include a graphics processor or coprocessor disposed on the same chip, or alternatively a graphics processor coupled to application processor 610 may comprise a separate, discrete graphics chip. Application processor 610 may include on board memory such as cache memory, and further may be coupled to external memory devices such as synchronous dynamic random access memory (SDRAM) 614 for storing and/or executing applications during operation, and NAND flash 616 for storing applications and/or data even when information handling system 600 is powered off. In one or more embodiments, instructions to operate or configure the information handling system 600 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 612 may control the broadband radio functions for information handling system 600. Baseband processor 612 may store code for controlling such broadband radio functions in a NOR flash 618. Baseband processor 612 controls a wireless wide area network (WWAN) transceiver 620 which is used for modulating and/or demodulating broadband network signals, for example for communicating via a 3GPP LTE or LTE-Advanced network or the like.

In general, WWAN transceiver 620 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 620 couples to one or more power amps 642 respectively coupled to one or more antennas 624 for sending and receiving radio-frequency signals via the WWAN broadband network. The baseband processor 612 also may control a wireless local area network (WLAN) transceiver 626 coupled to one or more suitable antennas 628 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 610 and baseband processor 612, and the scope of the claimed subject matter is not limited in these respects. For example, any one or more of SDRAM 614, NAND flash 616 and/or NOR flash 618 may comprise other types of memory technology such as magnetic memory, chalcogenide memory, phase change memory, or ovonic memory, and the scope of the claimed subject matter is not limited in this respect.

In one or more embodiments, application processor 610 may drive a display 630 for displaying various information or data, and may further receive touch input from a user via a touch screen 632 for example via a finger or a stylus. An ambient light sensor 634 may be utilized to detect an amount of ambient light in which information handling system 600 is operating, for example to control a brightness or contrast value for display 630 as a function of the intensity of ambient light detected by ambient light sensor 634. One or more cameras 636 may be utilized to capture images that are processed by application processor 610 and/or at least temporarily stored in NAND flash 616. Furthermore, application processor may couple to a gyroscope 638, accelerometer 640, magnetometer 642, audio coder/decoder (CODEC) 644, and/or global positioning system (GPS) controller 646 coupled to an appropriate GPS antenna 648, for detection of various environmental properties including location, movement, and/or orientation of information handling system 600. Alternatively, controller 646 may comprise a Global Navigation Satellite System (GNSS) controller. Audio CODEC 644 may be coupled to one or more audio ports 650 to provide microphone input and speaker outputs either via internal devices and/or via external devices coupled to information handling system via the audio ports 650, for example via a headphone and microphone jack. In addition, application processor 610 may couple to one or more input/output (I/O) transceivers 652 to couple to one or more I/O ports 654 such as a universal serial bus (USB) port, a high-definition multimedia interface (HDMI) port, a serial port, and so on. Furthermore, one or more of the I/O transceivers 652 may couple to one or more memory slots 656 for optional removable memory such as secure digital (SD) card or a subscriber identity module (SIM) card, although the scope of the claimed subject matter is not limited in these respects.

Figure 7:
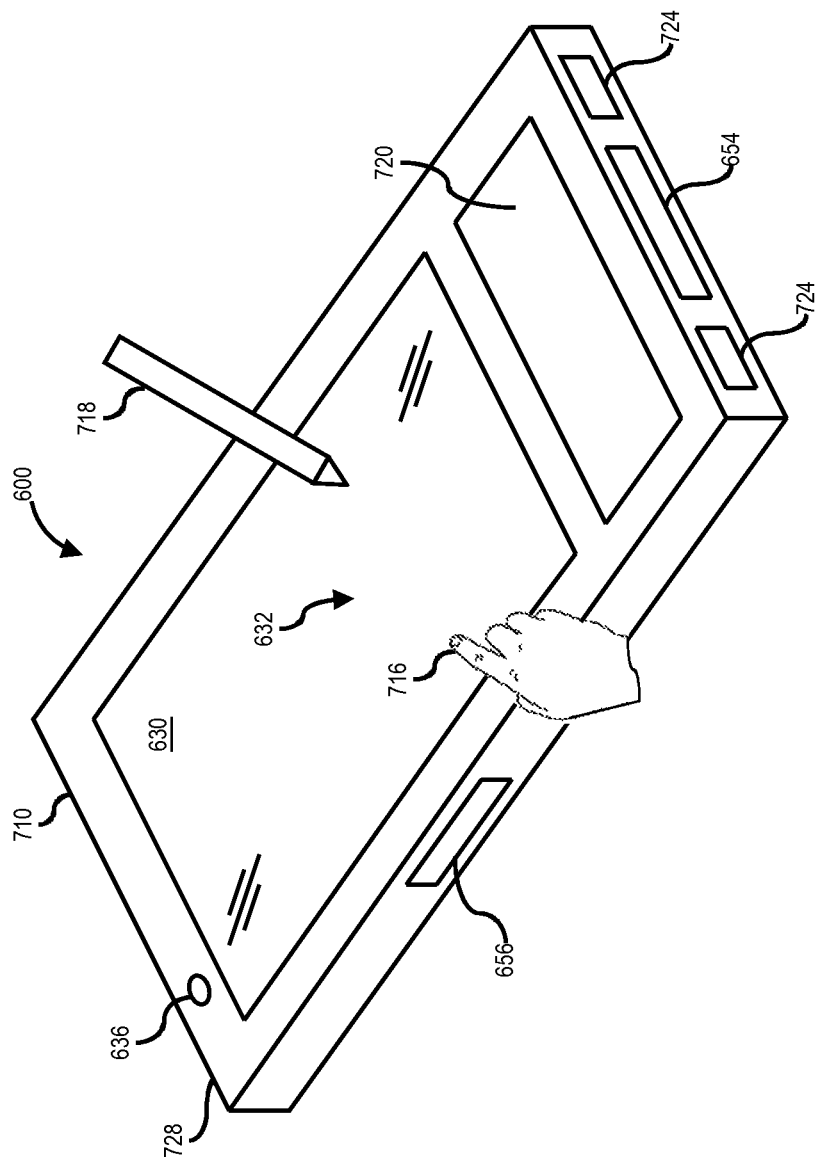
FIG. 7 is an isometric view of an information handling system of FIG. 6 that optionally may include a touch screen in accordance with one or more embodiments.

FIG. 7 is an isometric view of an information handling system of FIG. 6 that optionally may include a touch screen in accordance with one or more embodiments. FIG. 7 shows an example implementation of information handling system 600 of FIG. 6 tangibly embodied as a cellular telephone, smartphone, or tablet type device or the like. The information handling system 600 may comprise a housing 710 having a display 630 which may include a touch screen 632 for receiving tactile input control and commands via a finger 716 of a user and/or a via stylus 718 to control one or more application processors 610. The housing 710 may house one or more components of information handling system 600, for example one or more application processors 610, one or more of SDRAM 614, NAND flash 616, NOR flash 618, baseband processor 612, and/or WWAN transceiver 620. The information handling system 600 further may optionally include a physical actuator area 720 which may comprise a keyboard or buttons for controlling information handling system via one or more buttons or switches. The information handling system 600 may also include a memory port or slot 656 for receiving non-volatile memory such as flash memory, for example in the form of a secure digital (SD) card or a subscriber identity module (SIM) card. Optionally, the information handling system 600 may further include one or more speakers and/or microphones 724 and a connection port 654 for connecting the information handling system 600 to another electronic device, dock, display, battery charger, and so on. In addition, information handling system 600 may include a headphone or speaker jack 728 and one or more cameras 636 on one or more sides of the housing 710. It should be noted that the information handling system 600 of FIG. 7 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to simultaneous scheduling request transmission in dual connectivity and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus to handle simultaneous scheduling request transmissions, comprising:
   a transceiver; and
   a processor coupled to the transceiver, and memory coupled to the processor, wherein instructions in the memory configure the processor to:
      receive a first scheduling request transmission for a first cell group, and a second scheduling request transmission for a second cell group;
      determine one of the first scheduling request and the second scheduling request to have a higher priority and another one of the first scheduling request and the second scheduling request to have a lower priority; and
      process the scheduling request having the higher priority without processing the scheduling request having the lower priority;
   wherein instructions in the memory further configure the processor to assign the higher priority to a scheduling request received from a master cell group, and the lower priority to a scheduling request received from secondary cell group.

2. The apparatus as claimed in claim 1, wherein instructions in the memory further configure the processor to delay processing of the scheduling request having the lower priority to a next available scheduling request resource.

3. The apparatus as claimed in claim 1, wherein instructions in the memory further configure the processor to:
   drop the scheduling request transmission having the lower priority; and
   indicate to a media access control (MAC) layer that the scheduling request transmission having the lower priority has been dropped.

4. The apparatus as claimed in claim 1, wherein instructions in the memory further configure the processor to signal on a physical uplink control channel (PUCCH) that a scheduling request is being processed.

5. The apparatus as claimed in claim 1, wherein instructions in the memory further configure the processor to:
   drop a scheduling request from a secondary cell group currently being processed if a scheduling request transmission from a master cell group is received; and
   process the scheduling request for the master cell group.

6. The apparatus as claimed in claim 1, wherein instructions in the memory further configure the processor to:
   provide a scheduling request prohibit timer in a media access control (MAC) layer, wherein the scheduling request prohibit timer is used for both a master cell group and a secondary cell group; and
   prevent a physical (PHY) layer from signaling a scheduling request on a physical uplink control channel (PUCCH) for a later received scheduling request.

7. The apparatus as claimed in claim 1, wherein instructions in the memory further configure the processor to:
   provide a first scheduling request prohibit timer for a master cell group in a media access control (MAC) layer;
   provide a second scheduling request prohibit timer for a secondary cell group in the MAC layer; and
   delay processing of a later received scheduling request for a first one of the master cell group and the secondary cell group to a next scheduling request if there is any ongoing scheduling request being processed for another one of the master cell group and the secondary cell group.

8. The apparatus as claimed in claim 1 wherein the transceiver, the processor, and the memory comprise a modem.

9. The apparatus as claimed in claim 8, wherein the transceiver, the processor, and the memory comprise a user equipment.

10. An apparatus to configure simultaneous scheduling request transmissions, comprising:
   a transceiver; and
   a processor coupled to the transceiver, and memory coupled to the processor, wherein instructions in the memory configure the processor to:
      generate a first configuration of a first scheduling request for a master cell group and a second configuration of a second scheduling request for a secondary cell group in a system radio bearer (SRB); and
      transmit the SRB via the master cell group to a user equipment (UE) to process the first scheduling request and the second scheduling request;
      wherein the first scheduling request for the master cell group and the second scheduling request for the secondary cell group do not overlap each other.

11. The apparatus as claimed in claim 10, wherein the first scheduling request is configured by an evolved Node B for the master cell group, and the second scheduling request is configured by a secondary evolved Node B (SeNB) of the secondary cell group.

12. The apparatus as claimed in claim 10, wherein the first scheduling request is configured by an evolved Node for the master cell group, and the second scheduling request is configured by the evolved Node B for a secondary evolved Node B (SeNB) of the secondary cell group.

13. The apparatus as claimed in claim 10, wherein the UE may determine which of the first scheduling request and the second scheduling request to process if the first scheduling request and the second scheduling request are at least partially overlapping or fully overlapping.

14. The apparatus as claimed in claim 10 wherein the transceiver, the processor, and the memory comprise a modem.

15. The apparatus as claimed in claim 10, wherein the transceiver, the processor, and the memory comprise an evolved Node B (eNB).

16. An article of manufacture comprising a non-transitory medium having instructions stored thereon that, if executed, result in:
receiving a first scheduling request transmission for a first cell group, and a second scheduling request transmission for a second cell group;
determining one of the first scheduling request and the second scheduling request to have a higher priority and another one of the first scheduling request and the second scheduling request to have a lower priority; and
processing the scheduling request having the higher priority without processing the scheduling request having the lower priority;
wherein said determining comprises assigning the higher priority to a scheduling request received from a master cell group, and the lower priority to a scheduling request received from secondary cell group.

17. The article of manufacture as claimed in claim 16, wherein said determining comprises assigning the higher priority to an earlier received scheduling request, and the lower priority to a later received scheduling request.

18. The article of manufacture as claimed in claim 16, wherein the instructions, if executed, further result in comprising delaying processing of the scheduling request having the lower priority to a next available scheduling request resource.

19. The article of manufacture as claimed in claim 16, wherein the instructions, if executed, further result in:
dropping the scheduling request transmission having the lower priority; and
indicating to a media access control (MAC) layer that the scheduling request transmission having the lower priority has been dropped.

20. The article of manufacture as claimed in claim 16, wherein the instructions, if executed, further result in signaling on a physical uplink control channel (PUCCH) that a scheduling request is being processed.

21. The article of manufacture as claimed in claim 16, wherein the instructions, if executed, further result in:
dropping a scheduling request from a secondary cell group currently being processed if a scheduling request transmission from a master cell group is received; and
processing the scheduling request for the master cell group.

22. The article of manufacture as claimed in claim 16, wherein the instructions, if executed, further result in:
providing a scheduling request prohibit timer in a media access control (MAC) layer, wherein the scheduling request prohibit timer is used for both a master cell group and a secondary cell group; and
preventing a physical (PHY) layer from signaling a scheduling request on a physical uplink control channel (PUCCH) for a later received scheduling request.

23. The article of manufacture as claimed in claim 16, wherein the instructions, if executed, further result in:
providing a first scheduling request prohibit timer for a master cell group in a media access control (MAC) layer;
providing a second scheduling request prohibit timer for a secondary cell group in the MAC layer; and
delaying processing of a later received scheduling request for a first one of the master cell group and the secondary cell group to a next scheduling request if there is any ongoing scheduling request being processed for another one of the master cell group and the secondary cell group.

24. An article of manufacture comprising a non-transitory medium having instructions stored thereon that, if executed, result in:
generating a first configuration of a first scheduling request for a master cell group and a second configuration of a second scheduling request for a secondary cell group in a system radio bearer (SRB); and
transmitting the SRB via the master cell group to a user equipment (UE) to process the first scheduling request and the second scheduling request;
wherein the first scheduling request for the master cell group and the second scheduling request for the secondary cell group do not overlap each other.

25. The article of manufacture as claimed in claim 24, wherein the first scheduling request is configured by a master evolved Node B (MeNB) of the master cell group, and the second scheduling request is configured by a secondary evolved Node B (SeNB) of the secondary cell group.

26. The article of manufacture as claimed in claim 24, wherein the first scheduling request is configured by a master evolved Node B (MeNB) of the master cell group, and the second scheduling request is configured by the MeNB for a secondary evolved Node B (SeNB) of the secondary cell group.

27. The article of manufacture as claimed in claim 24, wherein the UE may determine which of the first scheduling request and the second scheduling request to process if the first scheduling request and the second scheduling request are at least partially overlapping or fully overlapping.

* * * * *